(12) United States Patent
Walters

(10) Patent No.: US 8,128,049 B2
(45) Date of Patent: Mar. 6, 2012

(54) RESILIENT MOUNTING SYSTEM WITH TILT CAPABILITIES

(75) Inventor: James D. Walters, Saint Charles, IL (US)

(73) Assignee: Peerless Industries, Inc., Aurora, IL (US)

( * ) Notice: Subject to any disclaimer, the term of this patent is extended or adjusted under 35 U.S.C. 154(b) by 416 days.

(21) Appl. No.: 12/060,449

(22) Filed: Apr. 1, 2008

(65) Prior Publication Data

US 2008/0237426 A1 Oct. 2, 2008

Related U.S. Application Data

(60) Provisional application No. 60/921,435, filed on Apr. 2, 2007.

(51) Int. Cl.
*B42F 13/00* (2006.01)
(52) U.S. Cl. ............. 248/339; 248/225.21; 248/220.21; 248/917; 248/923; 248/475.1; 248/304; 361/679.02; 361/679.21; 211/26
(58) Field of Classification Search ............ 248/225.21, 248/220.21, 215, 243, 917, 923, 312.1, 466, 248/489, 495, 496, 497, 690, 475.1, 304, 248/339; 361/679.02, 679.21; 211/26, 13.1, 211/87.01
See application file for complete search history.

(56) References Cited

U.S. PATENT DOCUMENTS

| | | | |
|---|---|---|---|
| 1,908,200 A | | 5/1933 | Webster |
| 3,337,172 A | * | 8/1967 | Jackson .................. 248/222.51 |
| 4,522,310 A | * | 6/1985 | Mikic et al. .................. 220/4.02 |
| 5,181,683 A | * | 1/1993 | Smith ....................... 248/231.31 |
| 5,487,517 A | * | 1/1996 | Smith ............................ 248/215 |
| 6,102,348 A | | 8/2000 | O'Neill |
| D493,800 S | | 8/2004 | Pfister et al. |
| D497,537 S | | 10/2004 | O'Keene et al. |
| 6,905,101 B1 | | 6/2005 | Dittmer |
| 6,923,413 B2 | * | 8/2005 | Dozier ........................ 248/294.1 |
| 7,070,156 B2 | * | 7/2006 | Liao ................................ 248/466 |
| D530,595 S | | 10/2006 | Lam et al. |
| 7,152,836 B2 | | 12/2006 | Pfister et al. |
| 7,178,775 B2 | | 2/2007 | Pfister et al. |
| D551,542 S | * | 9/2007 | Gallien et al. .................. D8/373 |
| D553,483 S | | 10/2007 | Grey |
| 7,334,766 B2 | * | 2/2008 | Ligertwood ............. 248/292.13 |
| 7,441,739 B2 | * | 10/2008 | Huang ..................... 248/292.14 |

(Continued)

FOREIGN PATENT DOCUMENTS

DE  20 2005 019 637 U1  6/2006

(Continued)

*Primary Examiner* — Terrell McKinnon
*Assistant Examiner* — Michael McDuffie
(74) *Attorney, Agent, or Firm* — Foley & Lardner LLP

(57) ABSTRACT

A mounting system for providing resilient mounting of a display device at a defined tilt angle. A surface mounting bracket configured to be attached to a mounting surface includes an engagement member and an engagement lip which are in communication with at least one engagement feature disposed on a display device bracket configured to be attached to a display device such as a flat panel television. The engagement feature, engagement lip, and engagement member are configured such that communication among these features results in an assembly that is resilient to inadvertent physical contact with the display device. The display device bracket is tiltable with respect to the surface mounting bracket, providing a defined tilt angle of the display device. Provision of a plurality of engagement features disposed on the display device bracket offers alternative assembly configurations, each capable of having defined tilt angles.

23 Claims, 12 Drawing Sheets

U.S. PATENT DOCUMENTS

| | | | | |
|---|---|---|---|---|
| 7,637,465 | B2 * | 12/2009 | Huang | 248/222.13 |
| 7,722,002 | B2 * | 5/2010 | O'Keene et al. | 248/274.1 |
| 7,878,473 | B1 * | 2/2011 | Oh | 248/339 |
| 2005/0072894 | A1 * | 4/2005 | Grant | 248/475.1 |
| 2005/0167549 | A1 * | 8/2005 | Ligertwood | 248/122.1 |
| 2007/0007409 | A1 | 1/2007 | Huang | |
| 2007/0040090 | A1 * | 2/2007 | Fay | 248/495 |
| 2007/0090250 | A1 | 4/2007 | O'Keene | |
| 2007/0251893 | A1 * | 11/2007 | Huang | 211/26 |
| 2007/0262215 | A1 * | 11/2007 | Tan | 248/201 |
| 2008/0035813 | A1 * | 2/2008 | O'Keene et al. | 248/225.21 |

FOREIGN PATENT DOCUMENTS

| | | |
|---|---|---|
| EP | 1 559 947 A2 | 8/2005 |
| JP | 4319993 A | 10/1992 |
| WO | WO 2005/004673 | 1/2005 |

* cited by examiner

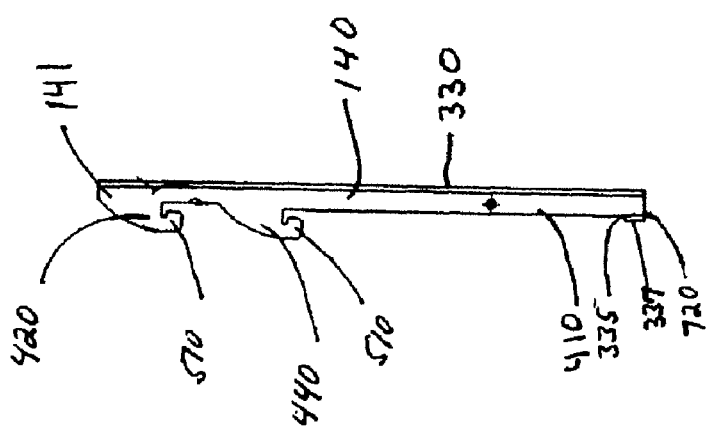

RESILIENT MOUNTING SYSTEM WITH TILT CAPABILITIES

CROSS-REFERENCE TO RELATED PATENT APPLICATION

This application claims priority from U.S. Provisional Patent Application 60/921,435 filed Apr. 2, 2007

FIELD OF THE INVENTION

The present invention relates generally to mounting systems. More particularly, the present invention relates to mounting systems for flat panel displays.

BACKGROUND OF THE INVENTION

In recent years, flat panel televisions have become enormously popular in both commercial and residential sectors. As the prices for plasma and liquid crystal display ("LCD") flat panel displays have continued to fall, and the quality for the same devices have improved, more and more businesses and individuals have purchased such devices for both home and business purposes.

One of the advantages of flat panel display devices that customers have found particular appealing is their relatively low thickness. Because conventional "tube" televisions have a relatively large depth, the placement options for such devices are quite limited. In the residential setting, most users require a television stand or large entertainment center to house the television. Such stands or entertainment centers can take up significant floor space, which is often undesirable. In the commercial or educational setting, users will often install large overhead mounting systems that can contain the television. However, these systems usually require professional installation and, once the television is secured to the mount, it is often difficult to access and adjust due to its height. With flat panel televisions, on the other hand, users are presented with a relatively new option: mounting the television directly to a mounting surface such as a wall. By mounting the television to the wall, the user can eliminate consumption of potentially valuable floor space.

Although the introduction of flat panel display devices on a wide scale has presented new opportunities to both residential and commercial customers, it has also presented new challenges. In particular, flat panel display devices, while usually having significantly smaller depth or profile than conventional "tube" televisions, tend to be quite heavy. The weight of a large flat panel display device can make proper wall mounting particularly challenging or even prohibitive to a residential user without engaging professional assistance. Where such significant weights are involved, it is especially important that users can easily, safely, and securely mount the devices without having to make substantial adjustments. Further, in view of safety considerations and the cost of such display devices, it is important that the device be mounted correctly on the first attempt: if the device is not correctly mounted on the first try, there is a high risk of damaging the device and causing injury to those installing it.

Additionally, the resilience of the mounted display device to incidental contact is also important. Because a flat panel can be massive and may be located where users frequent and where persons may be unaccustomed to encountering a television, it is important, from a safety perspective, that the display device be mounted such that it will not be dislodged by inadvertent, but sometimes significant, physical contact. Therefore, a display device should be mounted in a resilient manner such that the opportunity for disengagement of the display device from the mounting surface is mitigated.

Another aspect to take into account with flat panel display devices is the viewing angle. Certain flat panel display devices have narrow requirements regarding satisfactory angles from which the device can be satisfactorily viewed. Therefore, a mounting system should permit the tilt angle of the display to be manipulated to satisfy a particular viewing environment and a user's particular viewing requirements.

Yet another aspect to take into account with flat panel displays devices is the relative complexity in installing the mounting system and mounting the display to the mounting system. Conventional mounting systems often require a plethora of hardware for installation and attaching devices thereto. Although less complex mounting systems are available, these systems often lack robustness and/or tilt adjustability, rendering such mounting systems less desirable alternatives to more elaborate but cumbersome systems. As flat panel displays become more prevalent among consumers, it desirable to offer consumers an efficiently installable, yet robust mounting system that may be installed by the do-it-yourself user or is readily installed by a display mounting professional.

With the above considerations in mind, it would therefore be desirable to provide an improved mounting system that allows one to efficiently and resiliently mount a flat panel display at a defined tilt angle.

SUMMARY OF THE INVENTION

Various embodiments of the present invention comprise an improved system for mounting a display device to a mounting surface such as a wall. The system comprises a mounting surface bracket secured to the mounting surface having engagement features and one or more display device brackets affixed to the display device. The display device bracket incorporates one or more engagement features that communicate with the engagement features of the mounting surface bracket. The display device bracket is tiltable relative to the mounting surface bracket, thereby permitting achievement of different tilt angles for the display device. The mounting system robustly mounts the display device to the mounting surface such that the assembly is resilient to inadvertent physical contact with the display device, mitigating the probability that the display device will become displaced from the mounting surface.

The engagement features of the system may be disposed on the display device bracket such that the display, when mounted, is established at a defined tilt angle. By providing multiple engagement features, disposed along a length of the display device bracket, multiple alternative assembly configurations are provided to the user. Each of the assemblies may be capable of providing a defined tilt angle to the display device, selectable by the user. Thus, the user may achieve a desired tilt angle by selecting the appropriate engagement feature to engage the mounting surface bracket. Further, each engagement feature may accomplish multiple tilt angles when combined with a limiting bracket disposed on a portion of the display device bracket and configured to contact the mounting surface. In particular, a tilt bracket coupled to the display device bracket may be installed to establish a configuration having zero tilt angle. Thus, an efficient yet resilient mounting system is provided that permits the selection of a defined tilt angle for viewing the display device.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 4 is a side view of the mounting system of FIG. 1;

DETAILED DESCRIPTION OF VARIOUS EMBODIMENTS

Figure 1:
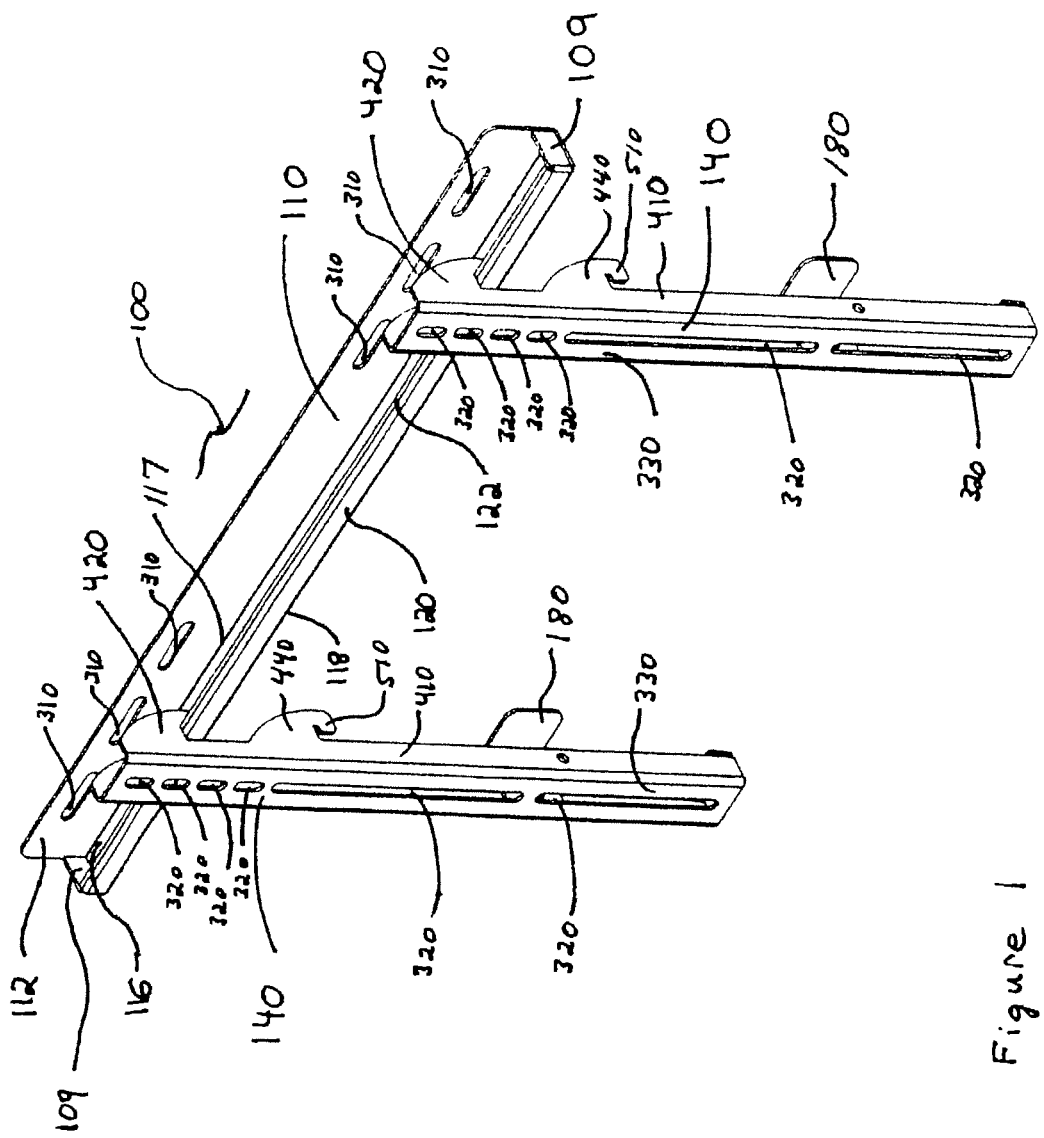
FIG. 1 is a perspective view of one embodiment of the present invention, showing a mounting surface bracket and two display brackets engaged with the mounting surface bracket.

FIG. 1 illustrates a mounting system 100 constructed in accordance with an embodiment of the present invention. The mounting system 100 comprises a mounting surface bracket 110 secured in a substantially horizontal orientation to a mounting surface and one or more of a display device bracket 140 securely engaging the mounting surface bracket 110 by way of one or more engagement features 420.

Figure 5A:
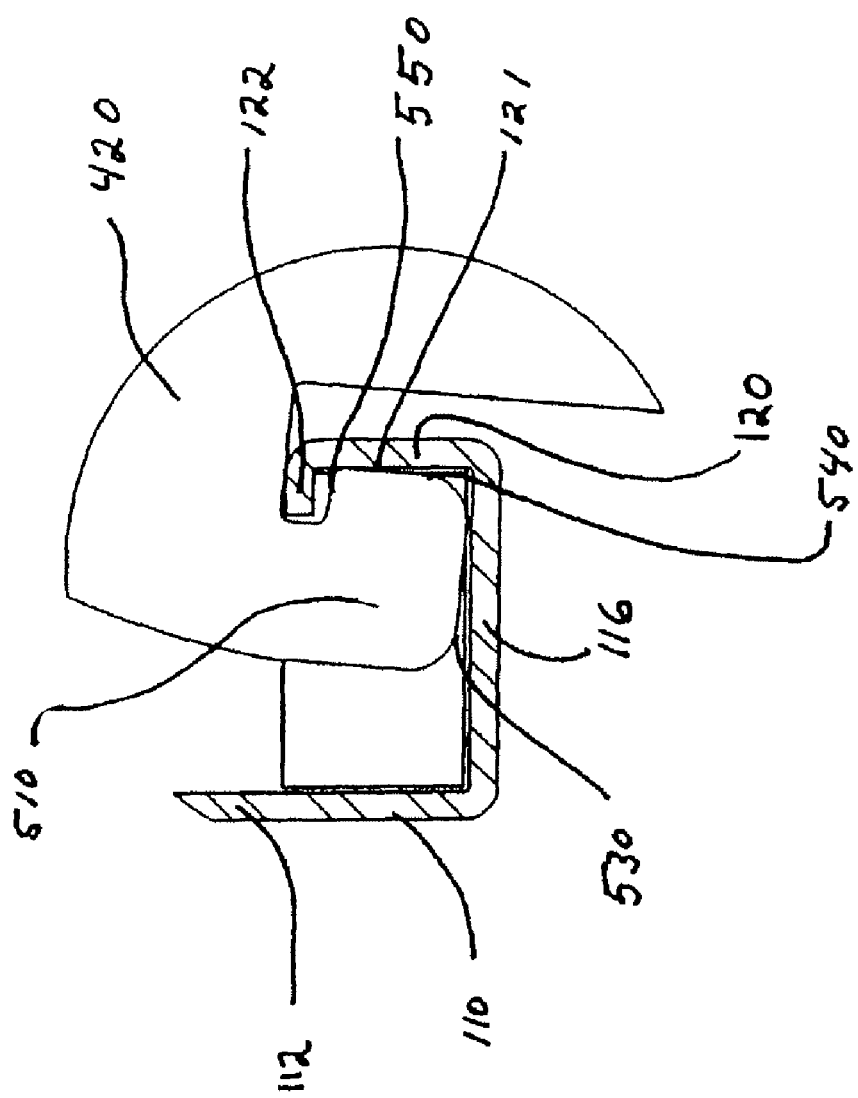
FIG. 5A is a detailed cross-section view of an embodiment of the present invention showing engagement of the mounting surface bracket and the display device bracket.
Figure 5B:
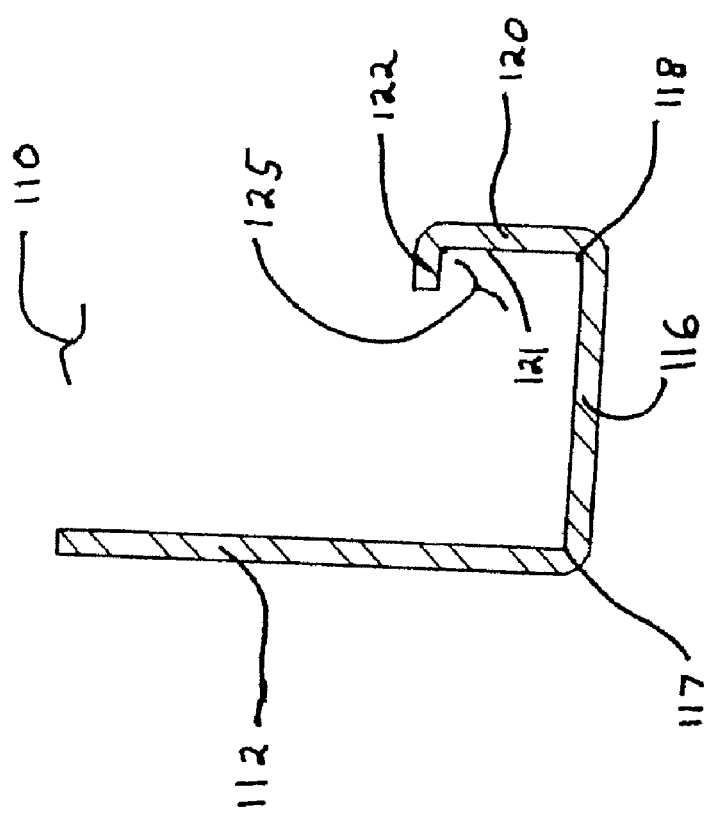
FIG. 5B is a detailed cross-section view of the engagement features of the mounting surface bracket of FIG. 5A.

In one embodiment of the present invention, the mounting surface bracket 110 comprises an elongated three-sided member comprising a wall plate 112 configured to be operatively connected to the mounting surface, a bottom plate 116 abutting the wall plate 112 at a first edge 117, and an engagement plate 120 abutting the bottom plate 116 at a second edge 118. The wall plate 112, engagement plate 120, and mounting surface are substantially parallel in this embodiment. As shown in FIG. 5B, the engagement plate 120 further includes an engagement lip 122 protruding from an interior face 121 of the engagement plate 120. An engagement region 125 is formed in the space approximately bounded by the bottom plate 116, the interior face 121, and the engagement lip 122, wherein an engagement feature 420 disposed on the display device bracket 140 engages the mounting surface bracket 110.

The mounting surface bracket 110 can further include one or more end plates 109 to provide additional structural stability to the mounting surface bracket 110 and further act as a horizontal translation stop for the display device brackets 140. It will be appreciated that the mounting surface bracket 110 may be provided in various configurations to accommodate the dimensions and weights of a variety of display device sizes. Further, the mounting surface bracket 110 may be comprised of a plurality of mounting surface brackets 110 affixed collinearly to the mounting surface.

Figure 3:
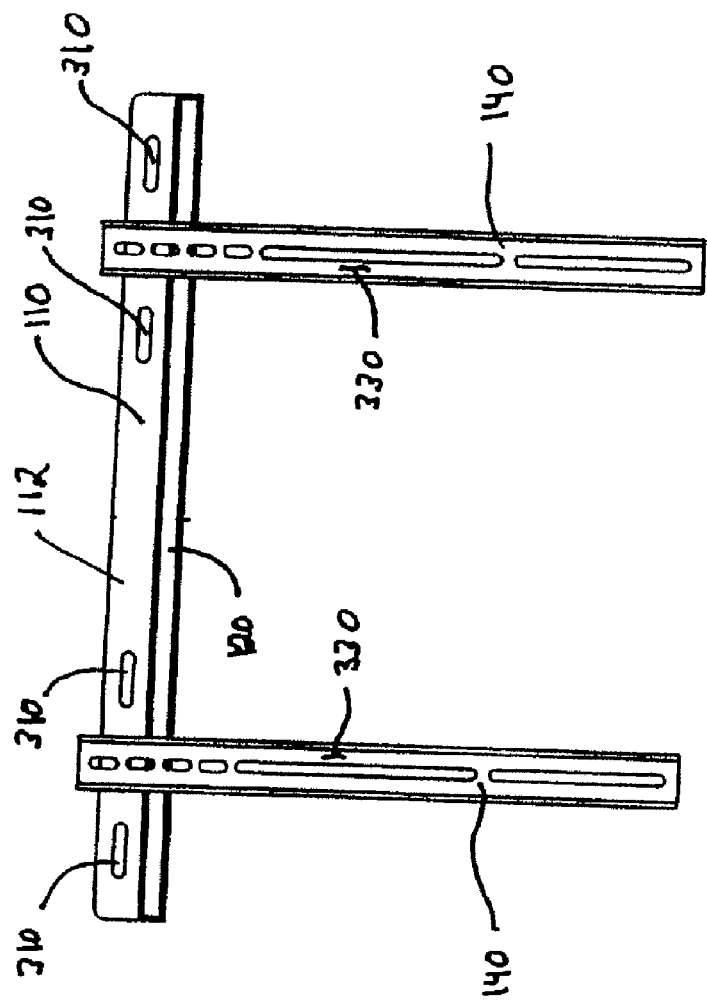
FIG. 3 is a front view of the mounting system of FIG. 1.

As illustrated in FIG. 3, the wall plate 112 of the mounting surface bracket 110 can be configured to be affixed to a mounting surface such as a wall or other desired surface via a plurality of slots 310 or holes for accepting bolts, screws, or other affixing devices. It should be noted that in various embodiments of the present invention, the plurality of slots 310 are substantially horizontally spaced and commensurate with standard wall stud spacing for the purposes of convenient and secure installation. Additionally, in various embodiments of the present invention, each of the plurality of slots 310 is a substantially horizontally elongated slot to allow for variations that can be experienced with the standard wall stud spacing.

As illustrated in the embodiment of FIG. 1, one or more display device brackets 140 engage the mounting surface bracket 110. The display device is secured to one or more of the display device brackets 140. As shown in FIG. 3, one embodiment of the system employs two display device brackets 140, horizontally spaced from each other so as to transfer the weight of the display device to the mounting surface bracket 110 in an approximately balanced manner. The mounting surface bracket 110 may be configured to provide lateral variation in the engagement position of the display device brackets 140, permitting for ease of assembly and horizontal adjustment of the mounted position of the display device.

In the embodiment illustrated in FIG. 3, the display mounting surface 330 of the display device bracket 140 faces the rear surface of the display device. The display device brackets 140 can be configured to be secured to the display device via a plurality of slots 320 for accepting bolts, screws, or other affixing devices. The slots 320 may be vertically spaced commensurate with mounting locations typically found on display devices. Additionally, embodiments of the present invention may be configured such that the slots 320 correspond to standardized patterns comprised of threaded inserts that are commonly located on the rear side of flat screen display devices.

Further, the display device brackets 140 may be configured to be operatively coupled to a display device adapter plate (not shown) or other assembly which ultimately attaches to the display device. An adapter plate can include a plurality of protrusions such as screws, for example, for mating with the threaded inserts of display devices, allowing the adapter plate to be secured to the display device. The adapter plate or other assembly and the display device can then be attached to the display device bracket 140 as described above. Further, the display device can be oriented in either a portrait or landscape mode depending on attachment of the adapter plate to the display device brackets 140, or by adjusting the orientation of the display device relative to the display device brackets 140.

Figure 2:
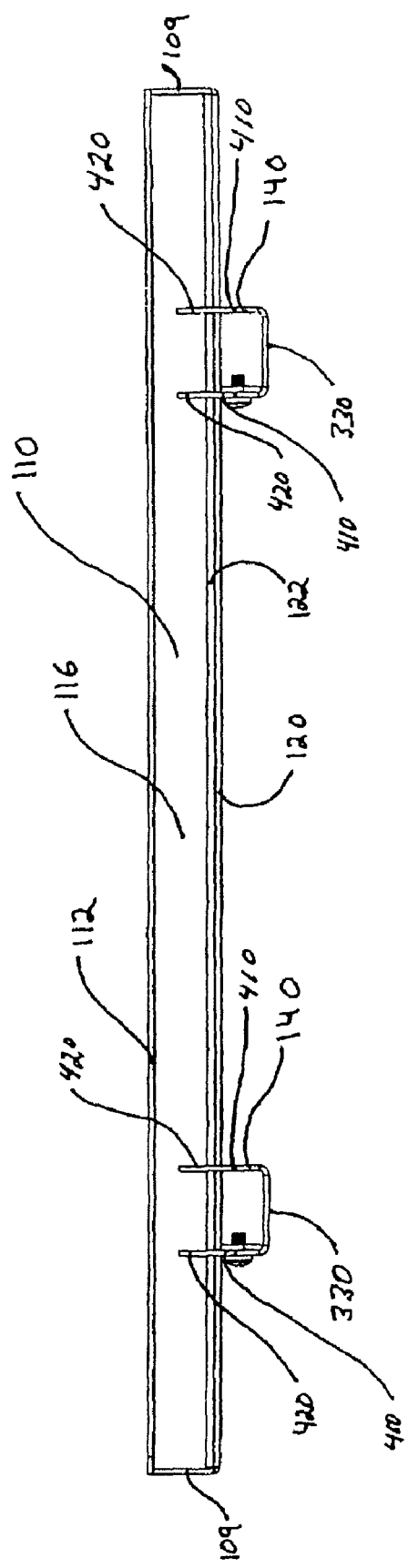
FIG. 2 is a top view of the mounting system of FIG. 1.

As shown in FIGS. 2 and 4, the display device bracket 140 is further configured with one or more engagement features 420. In one embodiment of the system, the display device bracket 140 is an elongated member comprising the mounting surface 330 and a pair of substantially parallel flanges 410 protruding substantially normal to the mounting surface 330 and disposed over a length of the display device bracket 140. The engagement feature 420, a hook in one embodiment of the invention, is disposed on each of the flanges 340 disposed on the display device bracket 140, thereby forming an engagement feature pair that communicate with the mounting surface bracket 110. It will be appreciated that the display device bracket 140 may be provided in various configurations to accommodate the dimensions and weights of a variety of display device sizes and various tilt angles.

Figure 5C:
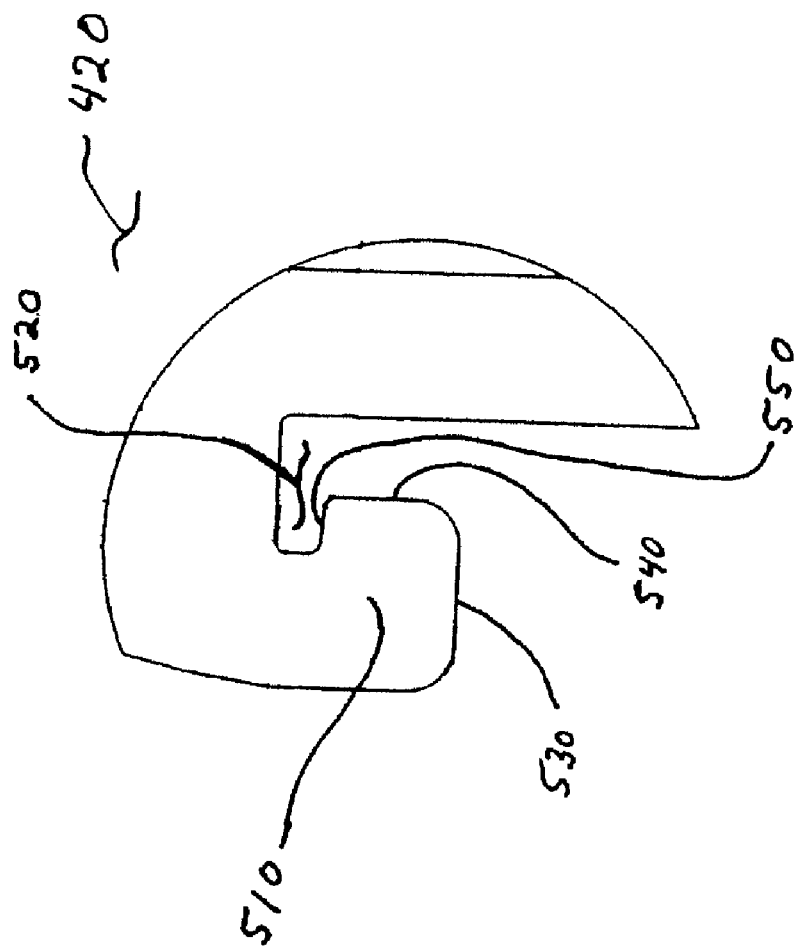
FIG. 5C is a detailed cross-section view of the engagement features of the display device bracket of FIG. 5A.

As best viewed in FIG. 5C, the engagement feature 420, in one embodiment, comprises an engagement head 510 having a inferior edge 530, an interior edge 540, a superior edge 550, and an undercut region 520. When the system 100 is assembled, as illustrated in FIG. 5A, the engagement feature 420 partially nests within the engagement region 125 of the mounting surface bracket, wherein the inferior edge 530 of the engagement head 510 operatively contacts the bottom plate 116 of the mounting surface bracket 110 and the interior edge 540 of the engagement head 510 operatively contacts the interior face 121 of the mounting surface bracket 110, thereby securely engaging the display device bracket 140 to the mounting surface bracket 110.

Figure 7:
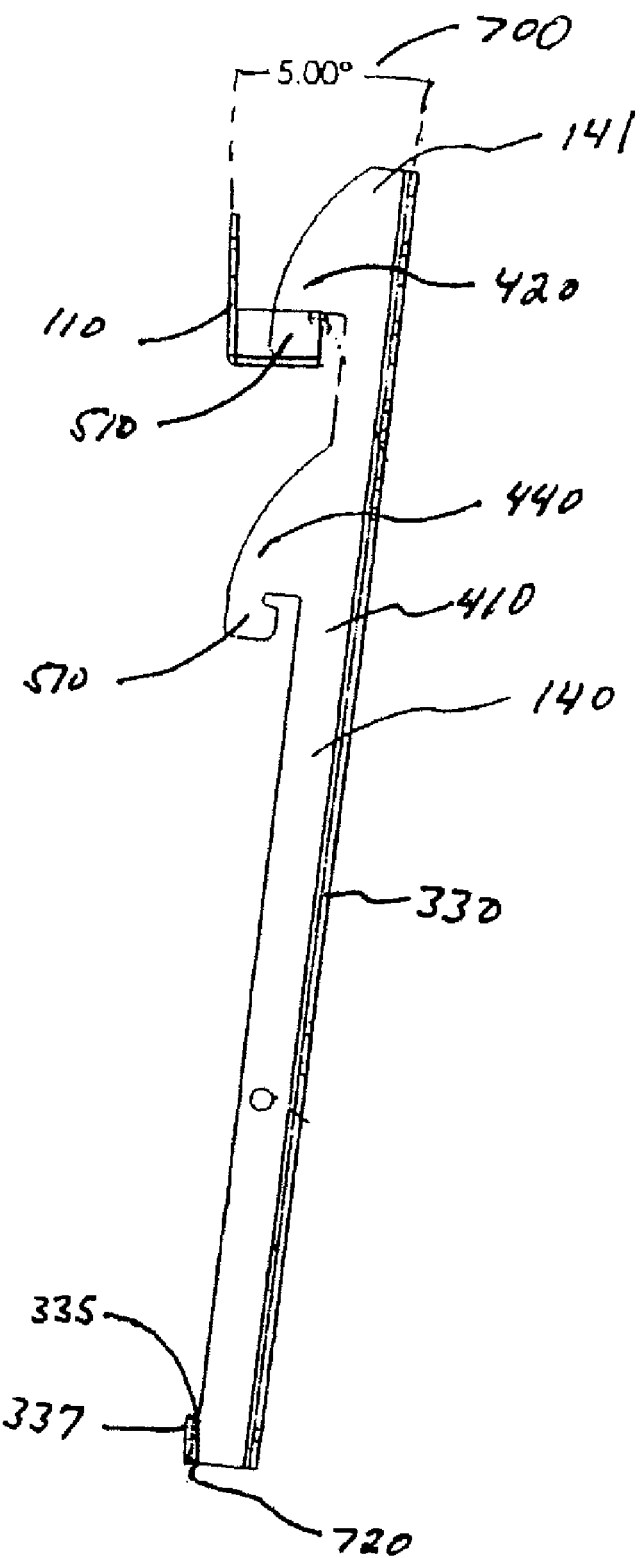
FIG. 7 is a side view of the mounting system of FIG. 6, showing the mounting system in a 5° tilt angle orientation.
Figure 8:
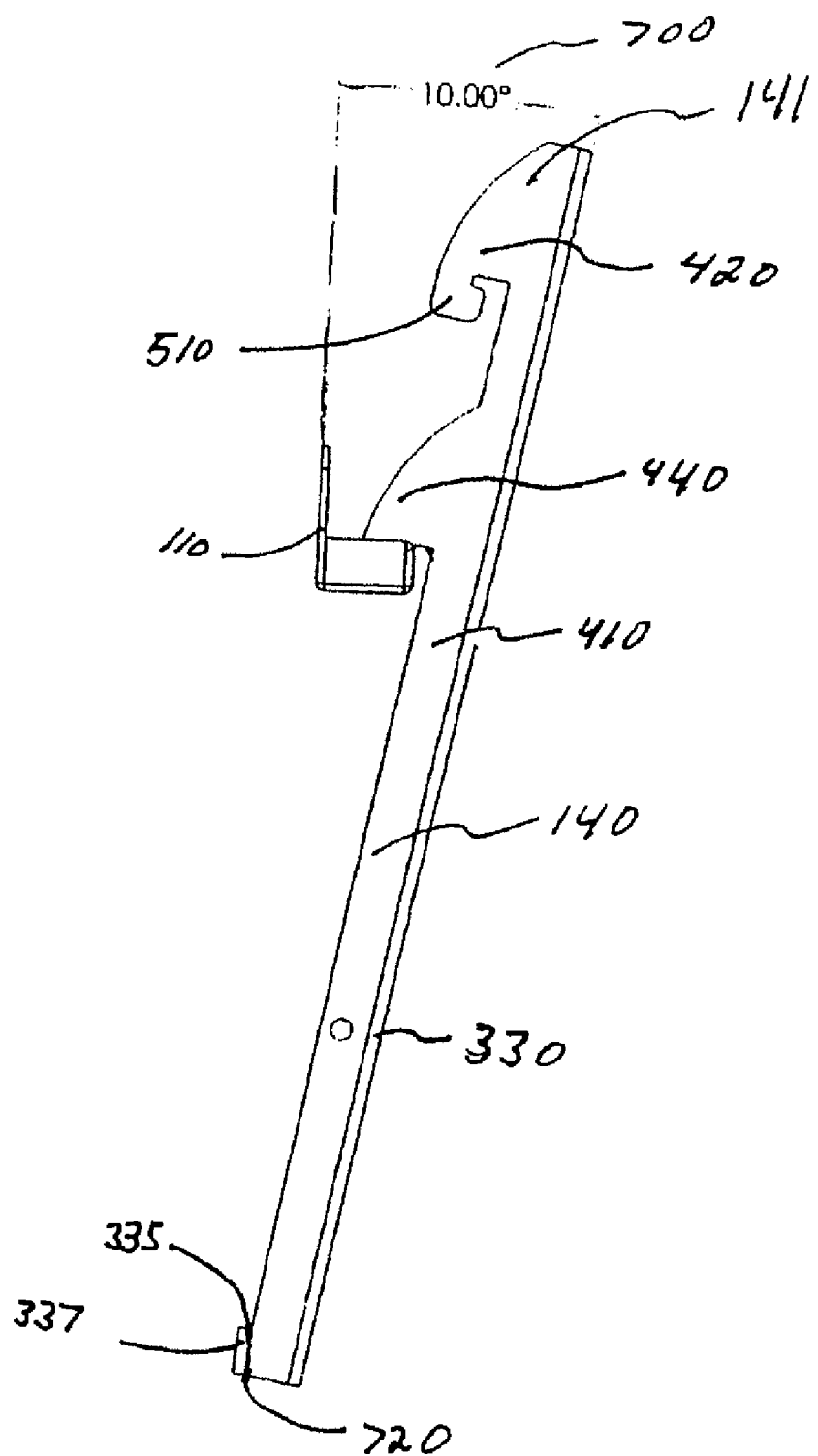
FIG. 8 is a side view of the mounting system of FIG. 7, showing the mounting system in a 10° tilt angle orientation.

The engagement region 125, the engagement head 510, and the undercut region 520 are dimensioned such that when assembled, inadvertent vertical translation of the mounted display device is impeded by contact of the engagement lip 122 with the superior edge 550 of the display device bracket 140. The engagement region 125, the engagement head 510, and the undercut region 520 are further dimensioned such that the display device bracket 140 is tiltable within the engagement region 125 relative to the mounting surface bracket 110. A tilt angle 700 of the display device, as illustrated in FIGS. 7 and 8, is achieved by tilt of the display device bracket 140 such that an upper portion of the display device bracket 141 moves substantially away from the mounting surface. However, undesired tilt in an opposite direction, where the upper portion of the display device bracket 141 moves substantially closer to the wall, is impeded by contact of the engagement lip 122 with the superior edge 550; contact of the bottom plate 116 with the inferior edge 530; and contact of the interior edge 540 with the engagement plate 120, thereby preventing the display device from tilting substantially beyond an orientation substantially parallel to the mounting surface. Thus, vertical translation and undesired tilt of the display device are impeded, thereby providing a display device mount resilient to unintended physical contact with the display device.

The mounting system 100 is configured to tilt the display device to the tilt angle 700 for optimal viewing. The tilt angle 700 is accomplished by permitting the display device bracket 140 to tilt in relation to the mounting surface bracket 110 about a substantially horizontal axis under the weight of the affixed display device, as illustrated in the embodiments of FIGS. 7 and 8. The engagement feature 420 and the mounting surface bracket 110 are configured to permit relative tilt to achieve the tilt angle 700 without compromising the impediment of inadvertent vertical translation or tilt of the lower portion of the display device away from the mounting surface. The display device bracket 140 may contact the mounting surface at a lower interior portion 335 disposed on the display device bracket 140. A compliant pad 337 may be affixed to the lower interior portion 335 to mitigate damage to the mounting surface resulting from contact of the display device bracket 140 with the mounting surface.

The tilt angle 700 may be limited by incorporating a tilt bracket 180 operatively coupled to the display device bracket 140. As shown in the embodiment illustrated in FIG. 6, the tilt angle 700 of zero degrees may be accomplished by engaging the first engagement feature 420 with the mounting surface bracket 110 and deploying the tilt bracket 180 configured such that contact with the mounting surface yields a tilt angle of substantially zero degrees. The tilt bracket 180 may further include a compliant pad 184 affixed to an interior surface 182 of the tilt bracket 180 to mitigate damage to the mounting surface resulting from contact of the tilt bracket 180 with the mounting surface.

Figure 6:
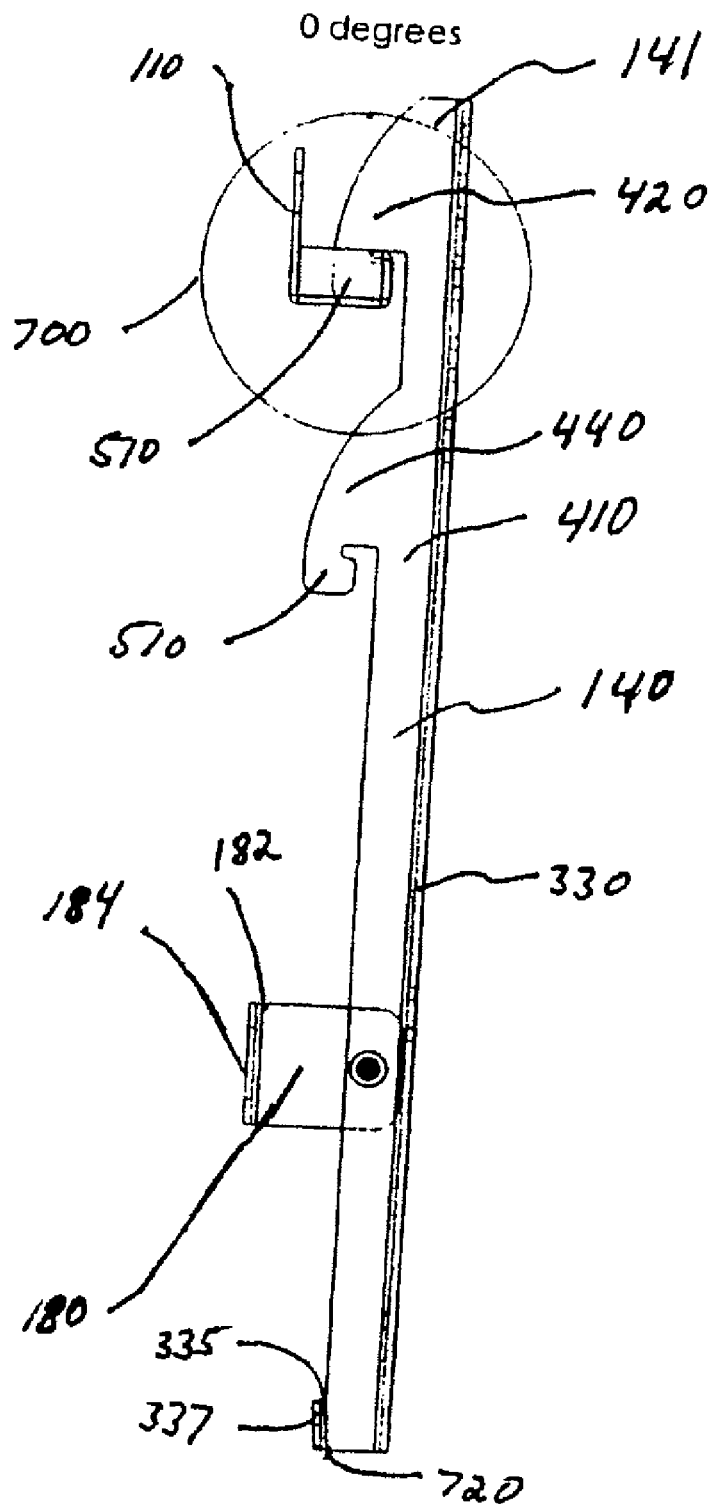
FIG. 6 is a side view of an embodiment of the present invention, showing the mounting system in a 0° tilt angle orientation.

In various embodiments of the invention, the display device bracket 140 may be configured with a plurality of the engagement features 420 disposed longitudinally along the flange 410. The plurality of engagement features 420 may further be provided as a plurality of engagement feature pairs as described above. As illustrated in FIG. 4, the display device bracket 140 includes a second engagement feature 440 disposed on the flange 410 and below the engagement feature 420. A plurality of the engagement features 420 can be positioned along the display device bracket 140 to provide a plurality of the tilt angle 700 of varying magnitude through assembly of alternative engagement features to the surface mounting bracket, as illustrated in FIGS. 6-8.

It will be appreciated that the tilt angle 700 is approximately a function of a distance defined as the normal distance approximately between the mounting surface and the interior face 121 of the mounting surface bracket 110 and a longitudinal distance defined as a distance approximately between the superior edge 550 and a lower interior edge 720 disposed on the display device bracket 140. In an embodiment illustrated in FIG. 7, assembly with the engagement feature 420 defines the tilt angle 700 of about 5°. In another embodiment, illustrated in FIG. 8, assembly with the second engagement feature 440, defines the tilt angle 700 of about 10°. The foregoing embodiments are merely provided as possible examples of the tilt angle 700. One will appreciate that alternative embodiments having a range of the tilt angle 700 are possible given the features thus described. Further, one skilled in the art will appreciate that, installation of the compliant pad 337, ordinary manufacturing variance, and local installation conditions may result in some variation of the tilt angle 700.

Figure 9:
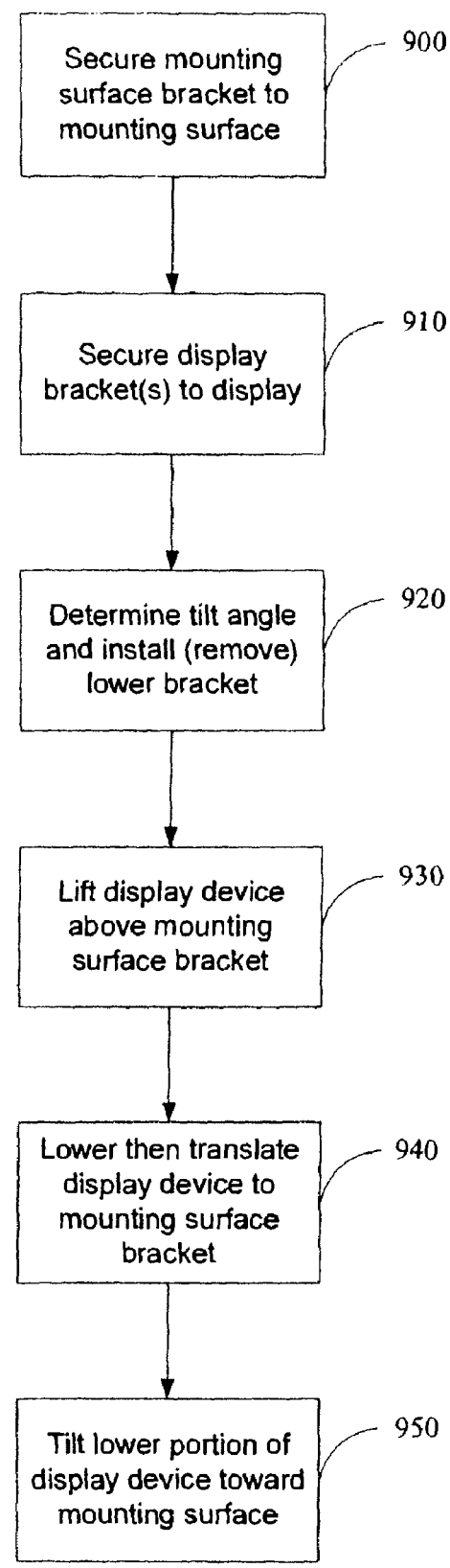
FIG. 9 is a flow chart illustrating a process for mounting a display device according to one embodiment of the present invention.

Turning to FIG. 9, a flow chart is provided depicting a process by which the mounting system 100 of the present invention is installed. When an installer desires to mount a display device to a wall or other mounting surface, the mounting surface bracket 110 is secured to the mounting surface (900) and the desired number of the display device brackets 140 are secured to the display device or adapter plate or adapter assembly (910). At 920, the installer chooses the tilt angle 700 that will provide the optimal viewing angle among the defined tilt angles 700 and selects the corresponding engagement feature 420 to achieve the tilt angle 700. If the tilt angle 700 is chosen to be substantially zero degrees, then the tilt bracket 180 is installed on the display device bracket 140. Alternatively, the system 100 may be supplied to the user with the tilt bracket 180 preinstalled and the installer may remove the tilt bracket 180 if the tilt angle 700 is desired to be greater than substantially zero degrees. The order of 900, 910, and 920 is interchangeable in various embodiments.

At 930, the installer lifts the display device, with the attached display device bracket 140, above the mounting surface bracket 110 such that the inferior edge 530 of the selected engagement feature 420 is slightly above the engagement lip 122 of the mounting surface bracket 110. Also at 930, the installer translates the display device toward the mounting surface such that the interior edge 540 of the engagement feature 420 is clear of the engagement lip 122. At 940, the installer lowers the display device until the inferior edge 530 contacts the lower plate 116 of the mounting surface bracket 110, and the installer translates the display device in a direction away from the mounting surface until interior edge 540 contacts the interior face 121 of the mounting surface bracket 110. At 950, where the tilt angle is greater than substantially zero degrees, the installer permits the lower portion of the display device to slowly tilt toward the mounting surface until the lower interior portion 335 of the display device bracket 140, or the compliant pad 337, if installed, contacts the mounting surface. At 950, where the tilt angle is substantially zero degrees, the installer permits the lower portion of the display device to slowly tilt toward the mounting surface until the interior surface 182 of the tilt bracket 180, or the compliant pad 184, if installed, contacts the mounting surface.

Figure 10:
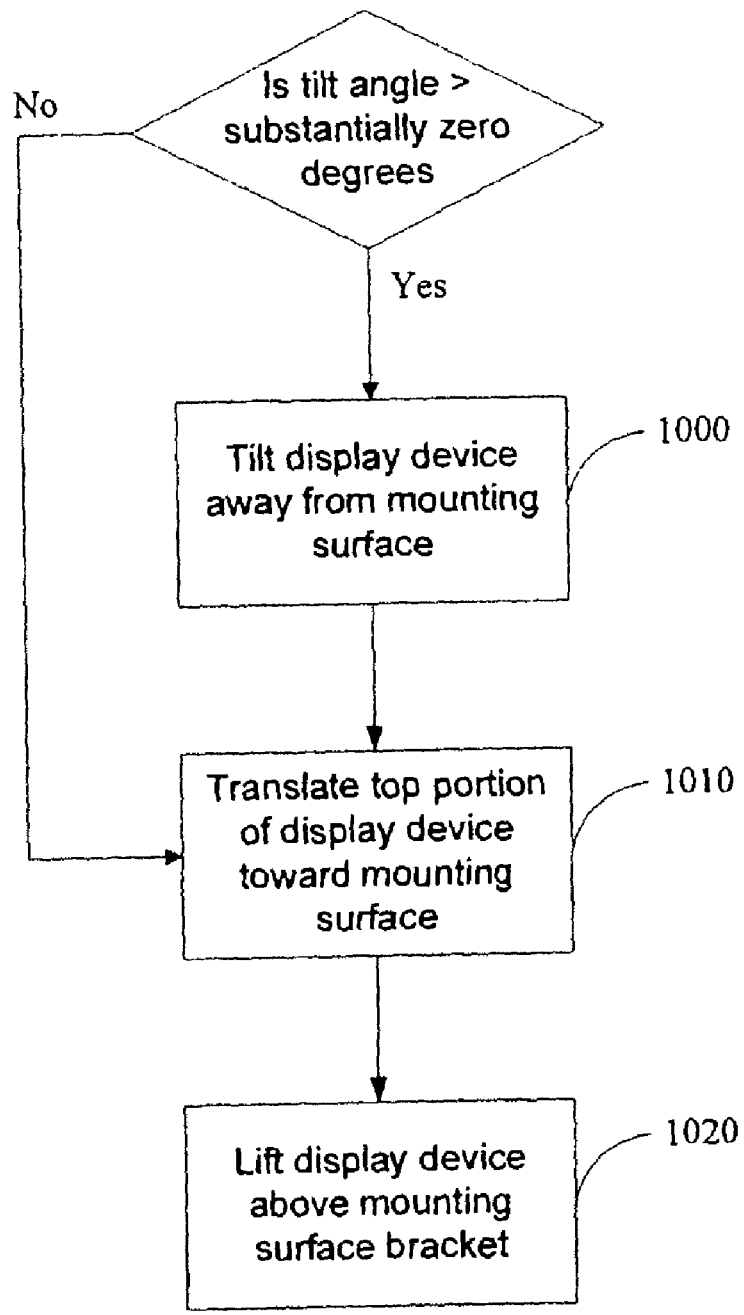
FIG. 10 is a flow chart illustrating a process for demounting a display device according to one embodiment of the present invention.

FIG. 10 is a flow chart depicting a process by which the display device is dismounted from the mounting surface for the purpose of modifying the tilt angle 700 or otherwise. Where the tilt angle 700 is greater than substantially zero degrees, the process begins at 1000, in which the user slowly tilts the lower portion of the display device away from the mounting surface until the tilt angle 700 is substantially zero degrees. Where the display device has a tilt angle of substantially zero degrees, at 1010, the user translates the top of the display device toward the mounting surface until translation is substantially resisted. At 1020, the user lifts the display device such that the inferior surface 530 of the engagement feature 420 is above the engagement lip 122 of the mounting surface bracket 110. The display device is then removed from the mounting surface bracket. The display device may then be reinstalled, if desired, in the same or a new orientation or with the tilt angle 700 different from the previous tilt angle 700, as described above and shown by the process illustrated in FIG. 9.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated.

What is claimed is:

1. A mounting system comprising:
   a mounting surface bracket configured to attach to a mounting surface, the mounting surface bracket including a mounting surface engaging portion, a bottom portion, an engagement portion spaced a distance from the mounting surface engaging portion, and an engagement lip protruding from the engagement portion in a direction substantially perpendicular to the mounting surface engaging portion, the bottom portion, the engagement portion, and the engagement lip defining an engagement region; and
   at least one display device bracket configured to operatively couple to a display device, the display device bracket including at least one engagement feature configured to engage the engagement portion and the engagement lip, the engagement feature characterized by an opening configured to at least partially receive the engagement lip and an engagement head configured to be at least partially received by the engagement region, the engagement head having a first surface substantially opposing and proximate the engagement lip, a second surface, and a third surface disposed between the first and the second surfaces and substantially opposing the engagement portion;
   wherein communication between the engagement feature of the at least one display device bracket and the engagement region including contact of the second surface with the bottom portion provides a resilient assembly of the display device to the mounting surface that impedes vertical translation of the display device bracket relative to the mounting surface bracket.

2. The system of claim 1, wherein the display device bracket is tiltable, relative to the mounting surface bracket, to a tilt angle.

3. The system of claim 2, wherein the display device bracket is configured such that a lower portion of the display device bracket contacts the mounting surface.

4. The system of claim 2, wherein the tilt angle is about zero degrees to about 10 degrees.

5. The system of claim 2, further including at least one tilt bracket operatively coupled to at least one of the display device bracket; and wherein the tilt bracket is configured to limit the tilt angle by contact with the mounting surface.

6. The system of claim 5, wherein the tilt angle is limited to substantially zero degrees.

7. The system of claim 1, wherein the display device bracket includes an engagement feature pair comprising a first engagement feature and a second engagement feature, and wherein the engagement feature pair is disposed on the display device bracket such that the first and the second engagement feature are in communication with the engagement portion and the engagement lip.

8. The system of claim 7, wherein a plurality of the engagement feature pairs are disposed along a length of the display device bracket, each of the plurality of engagement feature pairs having a first engagement feature and a second engagement feature configured to engage the engagement portion and the engagement lip in alternative assembly positions, thereby providing a plurality of alternative engagement feature pairs to accomplish a corresponding plurality of alternative assembly positions between the display device bracket and the mounting surface bracket.

9. The system of claim 8, wherein each of the plurality of alternative assembly positions comprises a defined tilt angle.

10. The system of claim 9, wherein the defined tilt angle of about 5 degrees is obtained by a first assembly position and the defined tilt angle of about 10 degrees is obtained by a second assembly position.

11. The system of claim 8, wherein the at least one device mounting bracket comprises two device mounting brackets, wherein a first engagement feature pair and a second engagement feature pair is disposed on each of the two device mounting brackets.

12. The system of claim 1, wherein the engagement feature comprises a hook.

13. The system of claim 1, wherein the at least one display device bracket is configured to operatively couple to an assembly, and wherein the assembly is configured to operatively couple to the display device.

14. The system of claim 1, wherein the mounting surface bracket comprises a plurality of the mounting surface brackets collinearly orientated on the mounting surface.

15. A method for mounting a display device comprising:
    attaching a mounting surface bracket to a mounting surface, the mounting surface bracket including a mounting surface engaging portion, a bottom portion, an engagement portion spaced a distance from the mounting surface engaging portion, and an engagement lip protruding in a direction substantially towards the mounting surface engaging portion, the bottom portion, the engagement portion, and the engagement lip defining an engagement region;
    operatively coupling at least one display device bracket to a display device, the at least one display device bracket including a plurality of engagement features disposed along its length and configured to selectively engage the engagement portion and the engagement lip in a plurality of alternative assembly orientations, each of the plurality of engagement features characterized by an opening configured to at least partially receive the engagement lip and an engagement head configured to be at least partially received by the engagement region, the engagement head having a first surface, a second surface, and a third surface disposed between the first and the second surfaces;

selecting a tilt angle and a corresponding engagement feature from the plurality of engagement features to accomplish the tilt angle;

raising the display device until the corresponding engagement feature is above the mounting surface bracket;

translating the display device towards the mounting surface until the corresponding engagement feature clears the engagement lip;

lowering the display device until the corresponding engagement feature is in communication with the mounting surface bracket;

translating the display device in a direction substantially away from the mounting surface engaging portion until the corresponding engagement feature engages the engagement portion;

allowing the display device bracket to tilt relative to the mounting surface bracket to the tilt angle;

wherein communication of the corresponding engagement feature of the at least one display device bracket and the engagement region including contact of the second surface with the bottom portion provides a resilient assembly that impedes vertical translation of the display device relative to the mounting surface in one of the plurality of assembly orientations.

16. The method of claim 15 further comprising deploying a tilt bracket operatively coupled to the display device bracket and configured such that communication of the tilt bracket with the mounting surface limits the tilt angle.

17. The method of claim 15, wherein the engagement feature comprises a hook.

18. A tiltable mounting system comprising:
a mounting surface bracket configured to attach to a mounting surface, the mounting surface bracket including a mounting surface engaging portion, a bottom portion, an engagement portion spaced a distance from the mounting surface engaging portion, and an engagement lip protruding in a direction substantially towards the mounting surface engaging portion, the bottom portion, engagement portion, and the engagement lip defining an engagement region; and at least one display device bracket selectively assemblable to the mounting surface bracket in a plurality of alternative orientations, the at least one display device bracket configured to operatively couple to a display device, the display device bracket including:
  a first engagement feature configured to selectively engage the engagement region and located on the display bracket to assemble the display device bracket to the mounting surface bracket in a first assembly orientation, and
  a second engagement feature configured to selectively engage the engagement region and located on the display bracket to assemble the at least one display device bracket to the mounting surface bracket in a second assembly orientation, wherein the first and the second engagement features are each characterized by an engagement head configured to be at least partially received by the engagement region and an opening configured to partially receive the engagement lip, and wherein communication between the first engagement feature of the at least one display device bracket and the engagement region including contact between the engagement head with the bottom portion provides a resilient assembly that impedes vertical translation of the display device relative to the mounting surface in the first assembly orientation and communication between the second engagement feature of the at least one display device bracket and the engagement region including contact between the engagement head with the bottom portion provides a resilient assembly that impedes vertical translation of the display device relative to the mounting surface in the second assembly orientation.

19. The tiltable mounting system of claim 18, wherein the mounting system is capable of a first tilt angle in the first assembly orientation, and wherein the mounting system is capable of a second tilt angle in the second assembly orientation.

20. The tiltable mounting system of claim 18, further including at least one tilt bracket operatively coupled to the at least one display device bracket; and wherein the tilt bracket is configured to limit the tilt angle by contact with the mounting surface.

21. A mounting system comprising:
a mounting surface bracket configured to attach to a mounting surface, the mounting surface bracket including a mounting surface engaging portion, a bottom portion, an engagement portion spaced a distance from the mounting surface engaging portion, and an engagement lip protruding from the engagement portion in a direction substantially perpendicular to the mounting surface engaging portion, the bottom portion, the engagement portion, and the engagement lip defining an engagement region; and at least one display device bracket configured to operatively couple to a display device, the display device bracket includes a plurality of engagement feature pairs that are disposed along a length of the display device bracket, each of the plurality of engagement feature pairs having a first engagement feature and a second engagement feature configured to engage the engagement portion and the engagement lip in alternative assembly positions, thereby providing a plurality of alternative engagement feature pairs to accomplish a corresponding plurality of alternative assembly positions between the display device bracket and the mounting surface bracket;

wherein each of the first and second engagement features is characterized by an opening configured to at least partially receive the engagement lip and an engagement head configured to be at least partially received by the engagement region, the engagement head having a first surface substantially opposing and proximate the engagement lip, a second surface, and a third surface disposed between the first and the second surfaces and substantially opposing the engagement portion;

wherein communication between the engagement feature of the at least one display device bracket and the engagement region provides a resilient assembly of the display device to the mounting surface; and wherein each of the plurality of alternative assembly positions comprises a defined tilt angle.

22. The system of claim 21, wherein the defined tilt angle of about 5 degrees is obtained by a first assembly position and the defined tilt angle of about 10 degrees is obtained by a second assembly position.

23. A tiltable mounting system comprising:
- a mounting surface bracket configured to attach to a mounting surface, the mounting surface bracket including a mounting surface engaging portion, a bottom portion, an engagement portion spaced a distance from the mounting surface engaging portion, and an engagement lip protruding in a direction substantially towards the mounting surface engaging portion, the bottom portion, engagement portion, and the engagement lip defining an engagement region; and
- at least one display device bracket selectively assemblable to the mounting surface bracket in a plurality of alternative orientations, the at least one display device bracket configured to operatively couple to a display device, the display device bracket including:
  - a first engagement feature configured to selectively engage the engagement region and located on the display bracket to assemble the display device bracket to the mounting surface bracket in a first assembly orientation, and
  - a second engagement feature configured to selectively engage the engagement region and located on the display bracket to assemble the at least one display device bracket to the mounting surface bracket in a second assembly orientation,
- wherein the first and the second engagement features are each characterized by an engagement head configured to be at least partially received by the engagement region and an opening configured to partially receive the engagement lip,
- wherein communication between the first engagement feature of the at least one display device bracket and the engagement region provides a resilient assembly of the display device to the mounting surface in the first assembly orientation and communication between the second engagement feature of the at least one display device bracket and the engagement region provides a resilient assembly of the display device to the mounting surface in the second assembly orientation; and
- wherein the mounting system is capable of a first tilt angle in the first assembly orientation, and wherein the mounting system is capable of a second tilt angle in the second assembly orientation.

\* \* \* \* \*